July 10, 1962  D. S. MUTTI  3,043,042
FISHING LURE
Filed Feb. 10, 1960
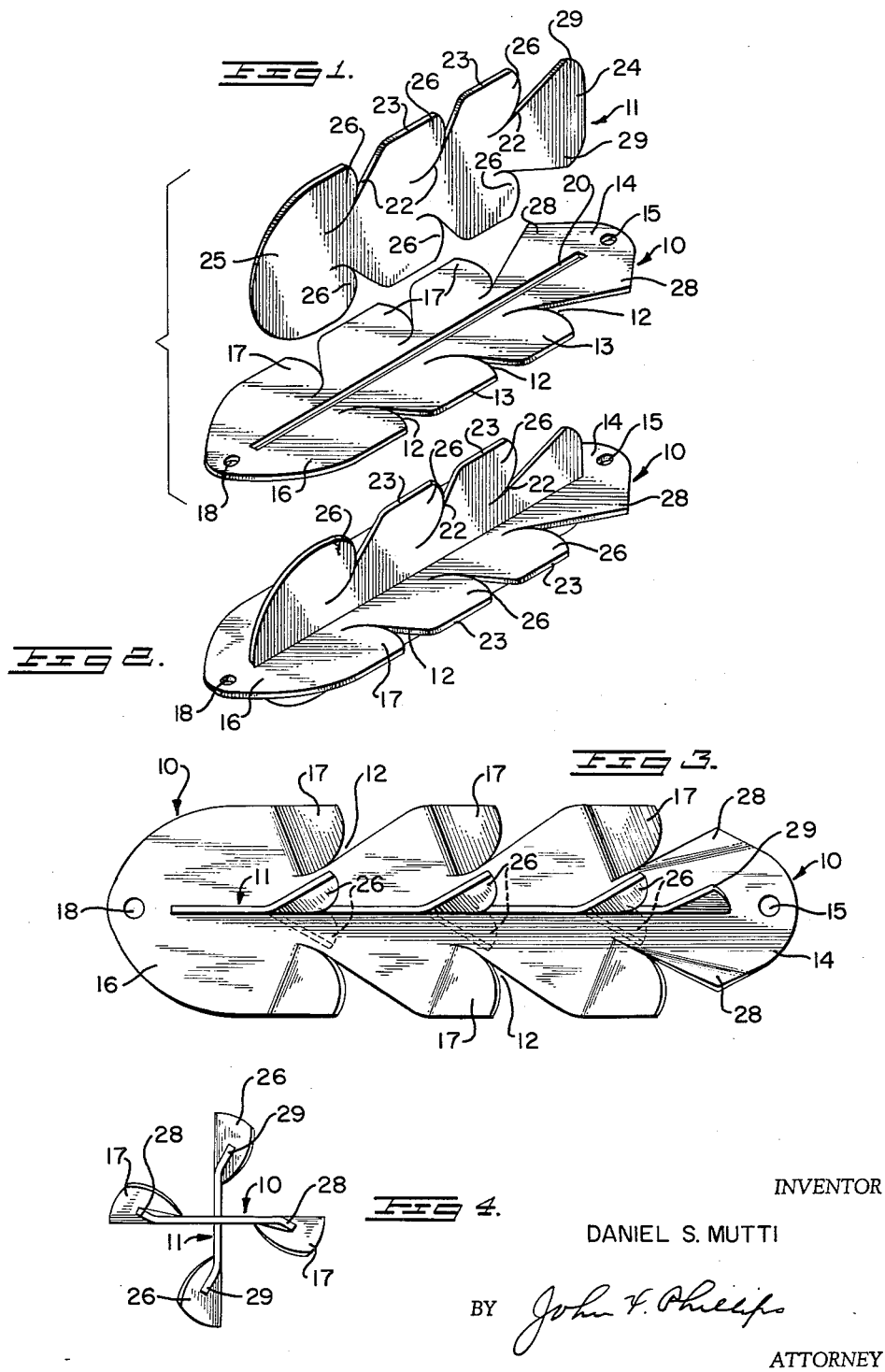
INVENTOR
DANIEL S. MUTTI
BY John F. Phillips
ATTORNEY

United States Patent Office 3,043,042
Patented July 10, 1962

3,043,042
FISHING LURE
Daniel S. Mutti, Rte. 1, Box 13, McGregor, Minn.
Filed Feb. 10, 1960, Ser. No. 7,861
2 Claims. (Cl. 43—42.51)

This invention relates to fishing lures, and preferably to such lures of the trolling type wherein the lure is caused to rotate on its own axis in moving through the water.

It has been proposed to provide lures of this type with helical fins or similar elements to cause the lure to rotate as it passes through the water. Devices of this kind operate efficiently so far as rotation is concerned, but they are somewhat expensive to manufacture and do not provide projecting elements of such nature as to attract the attention of the fish.

An important object of the present invention is to provide a novel type of lure having wing-like elements bent out of the planes of the body members of the device to cause it to rotate as it passes through the water, the bending of such elements being wholly practicable and economical to form.

A further object is to provide such a device wherein the wing-like elements constitute attention-attracting protuberances to make the lure more effective for attracting the fish.

A further object is to provide a lure of this type formed of horizontally elongated sheet-like body members arranged at right angles to each other and provided with wing-like projections on opposite edges of the two bodies, which projections are bent from the planes of the sheet metal bodies to cause the device to be more attractive and to serve the same purpose as helical vanes in causing the device to rotate as it passes through the water.

Other objects and advantages of the invention will become apparent during the course of the following description.

In the drawing I have shown one embodiment of the invention. In this showing:

FIGURE 1 is a perspective view of the two body blanks for making the device, shown separated;

FIGURE 2 is a similar view showing the two body members assembled;

FIGURE 3 is a plan view of the finished device; and

FIGURE 4 is an end elevation of the same.

Referring to FIGURES 1 and 2, the numerals 10 and 11 indicate as a whole the two body blanks used in forming the device. These two blanks are longitudinally elongated, and the blank 10 is substantially longer than the blank 11 for a reason which will become obvious. Opposite edges of the body member 10 are cut as at 12 to provide wing-like projections 13 intermediate the ends of the body 10, the rear cut-out portions 12 providing the body 10 with a tail portion 14 apertured as at 15 for the connection to the device of the usual hook. The forward cut-outs 12 provide the device with a head section 16, and this section, together with the projections 13, have formed at their rear extremities wing-like portions 17 all of which are preferably permitted to remain in the normal plane of the body section 10 until after the assembly of the device, as described below. The tail section 14 also preferably remains in the plane of the body section 10. The forward extremity of such body section is provided with an opening 18 for the connection of the leader to the lure in the usual manner.

The body section 11 is of a length end to end thereof intermediate its width equal to the length of a longitudinal slot 20 formed in the body section 10 and terminating short of the openings 15 and 18. The section 11 is cut away as at 22 to form two intermediate projections 23, a tail section 24, and a head section 25. The rear extremities of the head section 25 and projections 23 are formed as wing-like elements 26, corresponding generally in shape to the similar portions 17 of the body 10. Opposite edges of the tail sections 14 and 24 project laterally outwardly as at 28 and 29 respectively for a purpose to be described.

In making the present invention, the two blanks are formed as shown in FIGURE 1, whereupon one edge of the body member 11 is inserted through the slot 20 with the plane of the body section 10 lying intermediate the width of the body section 11 and with the two body sections arranged in planes perpendicular to each other. The parts will now be assembled as shown in FIGURE 2, whereupon the two body sections will be soldered, brazed, or otherwise permanently rigidly bonded to each other along the edges of the slot 20.

After the device has been assembled in the manner referred to, all of the wing-like projections 17 of the body section 10 and the corresponding sections 26 of the body section 11 will be bent angularly from the planes of the bodies as indicated in FIGURES 3 and 4. The lateral projections 28 of the body section 10 and the corresponding projections 29 of the body section 11 will also be angularly bent as shown in the rear end elevation of FIGURE 4. The bending of the projections referred to may take place in any suitable manner, for example by inserting the assembled body in FIGURE 2 in a press and simultaneously bending the projecting portions 17 and 28 of the body member 10, then turning the device at right angles and bending the projections 26 and 29 of the body member 11. All of these projections may be bent after the assembling of the device in FIGURE 2. However, it will be obvious that, if desired, all of the projections 17 and 28 of the body member 10 and the projections 26 and 29 at the top of the body section 11 as shown in FIGURE 1 may be bent prior to the assembling of the device. This would leave only the lower projections 26 and 29 of the body section 11 lying in the normal plane of such body section for the insertion of the lower edge of the body section 11 through the slot 20. The lower projections 26 and 29, as viewed in FIGURE 1, could then be bent in the manner stated. It has been found more economical to bend all the projections after the assembling of the device for the reason that it is easier to employ templates to position the parts if both body sections have all of their bendable elements allowed to remain in the normal planes of such elements until after the two body sections have been assembled.

*Operation*

The operation of the device will be apparent from the foregoing description. The cutting of the body sections as at 12 and 22 to form the body blanks may be carried out in a single operation for each of the body sections. As a matter of fact, the same dies may be employed for cutting the two body sections as at 12 and 26 after blanking the over-all shapes of the devices. In other words, the body section 10 may be initially blanked out to form the forward and rear ends, and a corresponding operation may be carried out as to the body section 11. Both sections then may be cut by the same dies to form the cut-outs 12 and 22. The slot 20 may be formed at any stage of the operation, for example when initially blanking out the body section 10.

As previously stated, it has been proposed to provide lures of this type with helical vanes to cause them to rotate in the water, and as a rule such vanes have smooth edges that do not particularly attract the attention of the fish. Moreover, the forming of the helices for such devices is a relatively expensive operation. The wing-like elements 17, 26, 28 and 29 of the present device are formed through simple bending operations and they serve to cause the lure to rotate on its own longitudinal axis when moving through the water. Moreover, the cutting of the body members as at 12 and 22 provides the two bodies with projecting portions certain of which are angularly bent to form protuberances which flash in the water and more effectively attract the attention of the fish than is true of helical vanes.

The present device can be made to rotate at a relatively high speed if desired, depending upon whether all of the elements 17, 26, 28 and 29 are bent and depending upon the angularity of the bending of such elements. In forming the cut-outs 12 and 22, a substantial portion of the metal is cut away, the edges of the cut-outs substantially diverging toward the edges of the two body members. This provides for the relatively free passage of water through the edge portions of the body members as the lure rotates in its passage through the water, thus minimizing flat surfaces which would tend to act as brakes to minimize the rotational speed of the lure.

From the foregoing it will be apparent that the present device is quite simple in construction and may be economically manufactured in quantities. The device, moreover, is highly effective in its action in the water and has been found highly attractive to the fish.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. A fishing lure comprising a pair of elongated sheet-like bodies, one of which is provided centrally of the width thereof with a straight longitudinal slot, the other body being mounted in said slot and rigidly bonded to said one body along the line of said slot and projecting from opposite faces of said one body, both edges of both of said bodies being provided with longitudinally spaced cuts dividing the edge portions of both bodies to form wings, each cut having an inner end relatively close to said line and each cut intermediate said inner end and the longitudinal edge of the associated body having its edges diverging to form V-shaped notches, each wing being bent along a line extending from said inner end of the associated cut to the longitudinal edge of the associated body, the bends in said wings all being in the same direction circumferentially transversely of the lure whereby the lure will rotate on its own axis as it moves through the water, both bodies substantially throughout their areas, except for said bent wing portions, being flat.

2. A fishing lure according to claim 1 wherein said bodies are provided with head and tail ends formed respectively by the foremost and rearmost of said cuts, said tail ends of both bodies having lateral projections bent in the same direction circumferentially of the lure to assist the bent portions of said wings in causing the lure to rotate on its own axis as it moves through the water.

References Cited in the file of this patent

UNITED STATES PATENTS

| | | |
|---|---|---|
| 836,038 | Hipp | Nov. 13, 1906 |
| 1,519,174 | Tomlin | Dec. 16, 1924 |
| 2,123,150 | Larson et al. | July 5, 1938 |
| 2,561,515 | Keeler | July 24, 1951 |
| 2,674,059 | Hayden | Apr. 6, 1954 |
| 2,763,953 | Criddle | Sept. 25, 1956 |